US012311511B2

(12) United States Patent
Gupte

(10) Patent No.: US 12,311,511 B2
(45) Date of Patent: May 27, 2025

(54) ANTI-BACKLASH RETENTION SOCKET

(71) Applicant: Snap-on Incorporated, Kenosha, WI (US)

(72) Inventor: Anup A. Gupte, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 10 days.

(21) Appl. No.: 17/391,191

(22) Filed: Aug. 2, 2021

(65) Prior Publication Data

US 2023/0031054 A1 Feb. 2, 2023

(51) Int. Cl.
*B25B 23/10* (2006.01)
*B25B 13/06* (2006.01)

(52) U.S. Cl.
CPC ............ *B25B 23/105* (2013.01); *B25B 13/06* (2013.01)

(58) Field of Classification Search
CPC .............................. B25B 23/105; B25B 13/06
USPC .................................... 81/120–125.1; 279/79
See application file for complete search history.

(56) References Cited

U.S. PATENT DOCUMENTS 1,797,525 A 3/1931 Eyles
1,830,127 A 11/1931 Newcomb
2,496,700 A 2/1950 Frederick
2,596,594 A * 5/1952 Petre .................. B25B 23/0042 81/439
2,972,493 A 2/1961 Waters
3,069,946 A * 12/1962 Zilliox ................. B25B 23/108 81/125
3,436,107 A * 4/1969 Gosta ........................ F16B 3/04 37/459
3,937,547 A 2/1976 Kemp
4,266,453 A 5/1981 Farley
4,477,096 A 10/1984 Wallace et al.
4,691,943 A 9/1987 Deland et al.
5,074,172 A 12/1991 Fetter et al.
5,261,772 A 11/1993 Henninger et al.
5,323,673 A 6/1994 Martinez et al.
(Continued)

FOREIGN PATENT DOCUMENTS

CN 2483149 Y 3/2002
CN 204135969 U 2/2015
(Continued)

OTHER PUBLICATIONS

Combined Search and Examination Report for corresponding Application No. GB2210658.7 dated Jan. 5, 2023, 9 pages.
(Continued)

*Primary Examiner* — Tom Rodgers
*Assistant Examiner* — Jacob Adam Montgomery
(74) *Attorney, Agent, or Firm* — Taft Stettinius & Hollister LLP

(57) ABSTRACT

A socket having a working end with a work piece aperture that is adapted to receive a work piece and an opposing drive end adapted to engage a torque application tool. The socket includes a biasing member adapted to apply a biased frictional force to the work piece received in the work piece aperture and including first and second opposing ends, where the first end is restricted from moving in the radial direction, and the second end includes a bent portion and is restricted from moving in the axial direction, and a groove formed in an internal surface of the work piece aperture. The bent portion engages the groove.

15 Claims, 3 Drawing Sheets

(56) References Cited

U.S. PATENT DOCUMENTS

| | | | | |
|---|---|---|---|---|
| 5,943,923 | A | 8/1999 | Shih | |
| 7,437,975 | B1 | 10/2008 | De Anfrasio | |
| 7,607,875 | B2 | 10/2009 | Shinozaki et al. | |
| 7,712,747 | B2 * | 5/2010 | Hu | B25B 23/0035 279/46.2 |
| 9,926,982 | B2 | 3/2018 | Pahlich | |
| 2004/0099103 | A1 * | 5/2004 | Vaughan | B25B 13/06 81/124.4 |
| 2006/0236822 | A1 * | 10/2006 | Nish | B25B 23/108 81/125 |
| 2007/0013149 | A1 * | 1/2007 | Hu | B23B 31/005 279/43.1 |
| 2007/0044596 | A1 * | 3/2007 | Chen | B25B 23/0035 81/125 |
| 2020/0276652 | A1 | 9/2020 | Sakakibara et al. | |

FOREIGN PATENT DOCUMENTS

| | | | | | |
|---|---|---|---|---|---|
| CN | 104354134 | B | | 6/2016 | |
| GB | 2295979 | A | * | 6/1996 | B25B 13/06 |
| JP | S61109676 | U | | 7/1986 | |
| TW | 303761 | U | | 4/1997 | |
| TW | 361325 | U | | 6/1999 | |
| TW | 367914 | U | | 8/1999 | |
| TW | B67915 | U | | 8/1999 | |
| TW | 391323 | U | | 5/2000 | |
| TW | 404292 | U | | 9/2000 | |
| TW | 492377 | U | | 6/2002 | |
| TW | 521025 | B | | 2/2003 | |
| TW | M344943 | U | | 11/2008 | |
| TW | M358695 | U | | 6/2009 | |
| TW | M361325 | | | 7/2009 | |
| TW | M425026 | U | | 3/2012 | |
| TW | M446070 | U | | 2/2013 | |
| TW | I551401 | B | | 10/2016 | |
| TW | I650206 | B | | 2/2019 | |
| TW | I674952 | B | | 10/2019 | |
| TW | M609189 | U | | 3/2021 | |
| WO | 2020153920 | | | 7/2020 | |

OTHER PUBLICATIONS

Taiwan Office Action for corresponding Application No. 111128345 dated Apr. 12, 2023, 16 pages.

United Kingdom Examination Report for corresponding UK Application No. GB2210658.7, dated Sep. 14, 2023, 6 pages.

Canadian Office Action for corresponding CA Application No. 3,169,147, dated Oct. 11, 2023, 3 pages.

Examination Report for corresponding United Kindgom Application No. GB2210658.7 dated Dec. 12, 2023, 4 pages.

Australian Examination Report No. 1 for corresponding AU Application No. 2022206763, dated Aug. 31, 2023, 4 pages.

Taiwan Office Action for corresponding TW Application No. 112141288, dated Jan. 24, 2024, 14 pages.

* cited by examiner

ANTI-BACKLASH RETENTION SOCKET

TECHNICAL FIELD OF THE INVENTION

The present invention relates generally to sockets for hand tools. More particularly, the present invention relates to sockets adapted to control backlash between the socket and a fastener engaged with the socket.

BACKGROUND OF THE INVENTION

Sockets are a popular form of engaging and then applying torque to work pieces, such as bolts, nuts, screws, or other fasteners. Sockets are typically elongated, cylindrical pieces that engage the work piece head at a working end and connect to a torque application tool having a lug, for example a socket wrench, torque wrench or impact driver, at a drive end opposite the working end. The socket can apply torque to a work piece to either insert or remove the work piece from a working material by transferring the torque applied by the wrench connected to the work piece.

Sockets can be different sizes or shapes to account for differently sized or shaped work pieces. For example, a bolt having a hexagonal head that is ½" wide can be torqued with a ½" socket. Such a socket would typically include a ¼", ⅜", or ½" square female aperture disposed on the working end that would be matingly coupled with a torque application tool having a similarly ¼", ⅜" or ½" square male drive lug. The socket/torque application tool engagement also typically includes a detent mechanism, such as where the square female aperture of the socket includes an indent that detentably engages an outwardly biased ball disposed on the drive lug of the torque application tool to detain the socket on the drive lug. Typically, the ball is outwardly biased with a compression spring. When the torque application operation is complete, or the socket needs to be changed or otherwise removed from the torque application tool, the socket can thus be forcibly removed from the lug by applying an outward force that causes the detent to overcome the outward bias of the ball in the detent mechanism.

However, current sockets have some amount of lost-motion when used to turn work pieces, which is referred to as backlash or slippage. In other words, when the socket turns but the work piece does not immediately turn in kind. Backlash occurs due to the minimal clearance needed to easily insert the work piece into the socket. Current sockets are also unable to retain the work piece in the socket due to the clearance provided to insert the work piece. Moreover, the more that a work piece is engaged by a socket, the greater the chances of dimensional changes to the work piece, due to, for example, backlash.

SUMMARY OF THE INVENTION

The present invention relates broadly to a socket that limits backlash between the socket and a work piece engaged with the socket. The socket includes a biasing member, such as, a pliable sheet metal member, disposed in a work piece receiving portion on the working end of the socket and adapted to apply a biased frictional force to a work piece engaged by the socket. The biasing member includes first and second ends. One of the first and second ends is fixed in the radial direction, and the other of the first and second ends is fixed in the axial direction by a groove formed in the socket. The end fixed in the axial direction moves radially into the groove as the socket engages the work piece. The end fixed in the axial direction is fully seated in the groove when the socket completely receives the work piece and retracts (i.e., moves radially away from the groove) when the work piece is retracted from the socket. The bias force generated by the bias member maintains a positive, frictional interaction between the socket and the work piece, thereby limiting lost-motion (i.e., backlash), and allows the socket to better engage the work piece.

In an embodiment, the present invention broadly comprises a socket including a working end with a work piece aperture adapted to receive a work piece and an opposing drive end adapted to engage a torque application tool, such as, for example, with a lug. The socket includes a biasing member adapted to apply a biased frictional force to the work piece received in the work piece aperture and including first and second opposing ends, wherein the first end is restricted from moving in the radial direction, and the second end includes a bent portion and is restricted from moving in the axial direction, and a groove formed in an internal surface of the work piece aperture. The bent portion is received in the groove.

In another embodiment, the present invention broadly comprises a biasing member adapted to apply a biased frictional force to a work piece received in a work piece aperture of a socket. The biasing member includes a first end adapted to be restricted from moving in the radial direction relative to the socket, and a second end having a bent portion and restricted from moving in the axial direction relative to the socket. The bent portion is adapted to engage a groove formed in an internal surface of the work piece aperture.

In another embodiment, the present invention broadly comprises a socket having a working end with a work piece aperture that is adapted to receive a work piece and an opposing drive end adapted to engage a torque application tool. The socket includes a flexible sheet metal piece adapted to apply a biased frictional force to the work piece when received in the work piece aperture and including first and second opposing ends, where the first end is restricted from moving in the radial direction, and the second end includes a bent portion and is restricted from moving in the axial direction, and a groove formed in an internal surface of the work piece aperture and at least partially surrounding the work piece aperture. The bent portion engages the groove. The second end is adapted to move radially into the groove as the work piece is inserted into the work piece aperture, and the second end moves radially away from the groove when the work piece is retracted from the work piece aperture.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
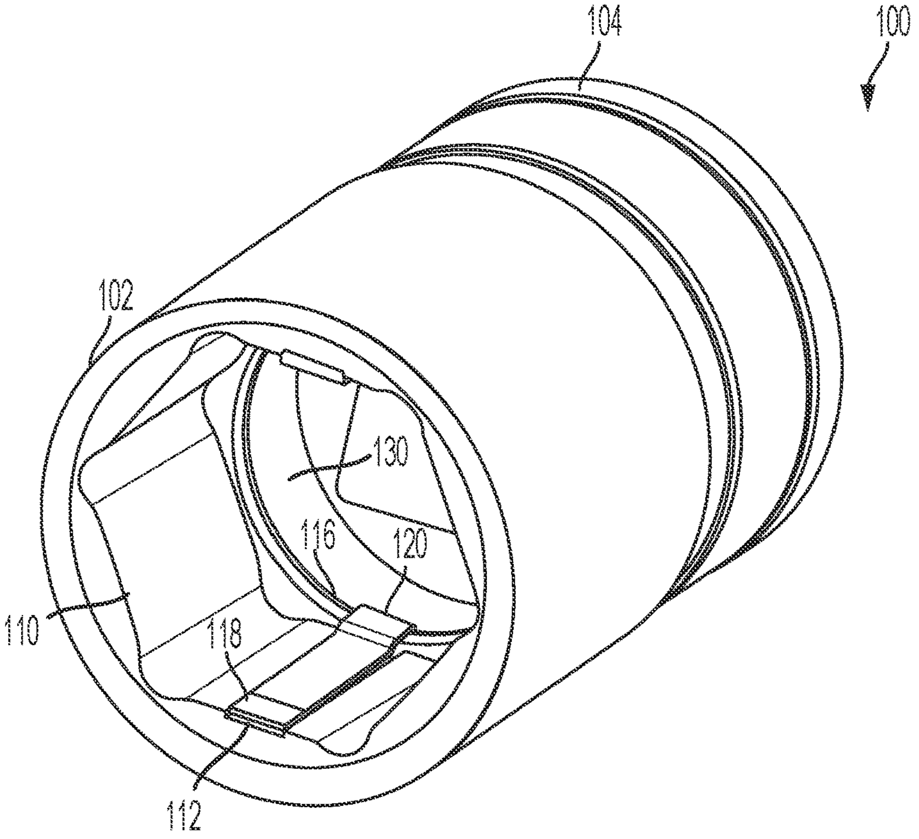
FIG. 1 is a perspective view of a socket, including an embodiment of the present invention.
Figure 2:
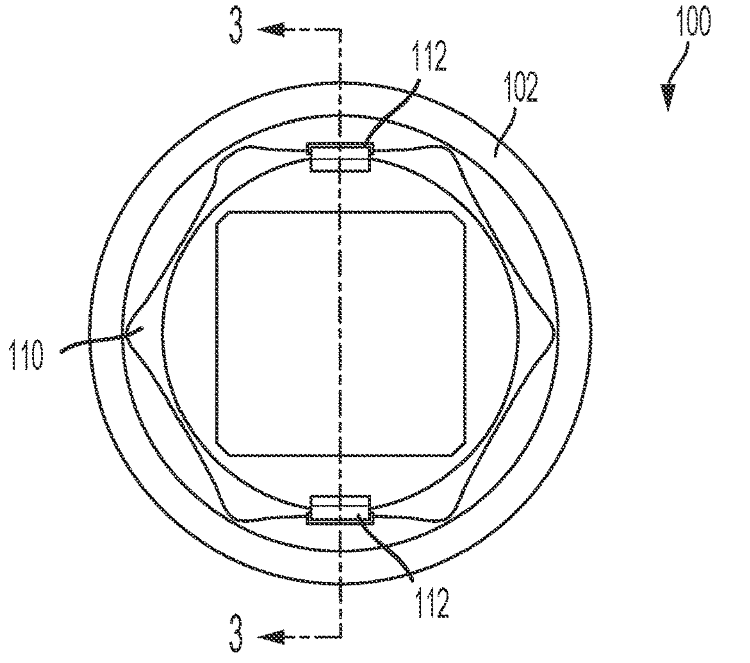
FIG. 2 is a plan, front view of the socket of FIG. 1.
Figure 3:
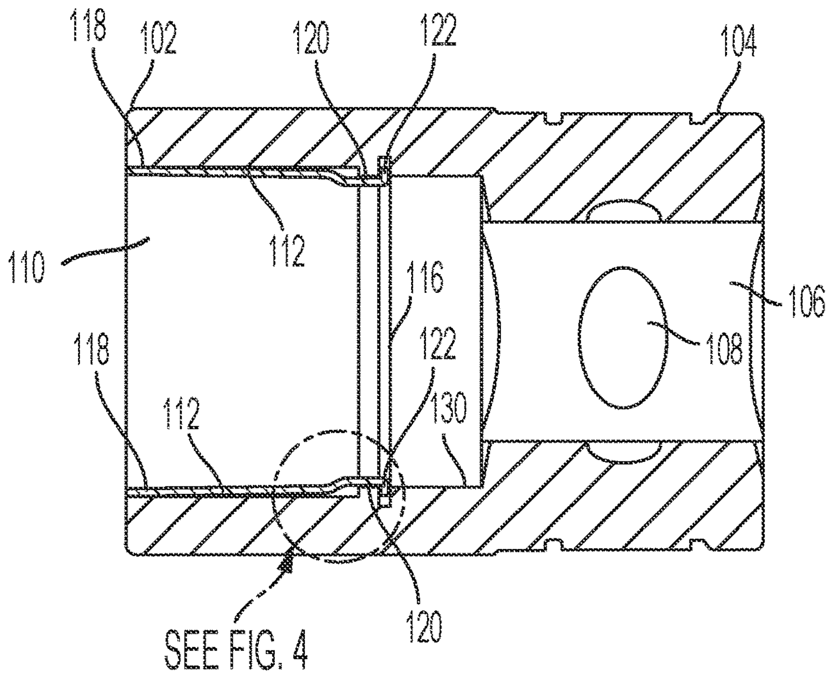
FIG. 3 is a section view of the socket according, to an embodiment of the present invention taken along line 3-3 of FIG. 2.
Figure 4:
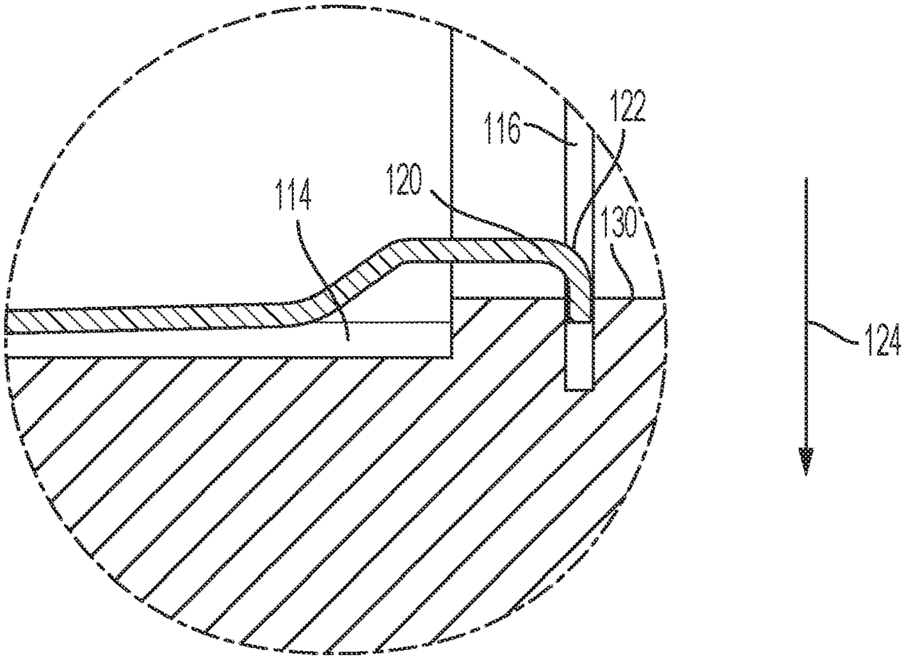
FIG. 4 is a detailed, perspective view of the socket, including an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a socket that limits or controls backlash or slippage between the socket and a work piece engaged with the socket. The socket includes a biasing member, such as, a pliable sheet metal member, disposed in a work piece receiving portion on the working end of the socket and adapted to apply a biased frictional force to a work piece engaged by the socket. The biasing member includes first and second ends. One of the first and second ends is fixed in the radial direction, and the other of the first and second ends is fixed in the axial direction by a groove formed in the socket. The end fixed in the axial direction moves radially in the groove as the socket engages the work piece, caused by the work piece pushing outwardly on the send fixed in the axial direction. The end fixed in the axial direction is substantially seated in the groove when the socket completely receives the work piece and retracts (i.e., moves radially away from the groove) when the work piece is retracted from the socket. The bias force generated by the bias member maintains a positive, frictional interaction between the socket and the work piece, thereby limiting or controlling lost-motion (i.e., backlash or slippage), and allows the socket to better engage the work piece.

Referring to FIGS. 1-5, a socket 100 includes a working end 102 and an opposing drive end 104. The drive end 104 is adapted to releasably couple with a torque application tool, such as, for example, a drill, ratchet, torque, or impact wrenches, screwdriver, router, etc. In an embodiment, the drive end 104 includes a drive aperture 106, for example, a square shaped bore, that is adapted to be releasably coupled with a square male lug of a torque application tool. The drive aperture 106 can further include an indent 108 disposed on an inner surface thereof that is adapted to detainably engage an outwardly biased ball disposed on the male lug of the tool. It will be appreciated that the any one or more of the inner surfaces of the drive aperture 106 can include the indent 108. In an alternate embodiment (not shown), the drive end 104 includes a male protrusion adapted to engage a "female" counterpart in the torque application tool.

Figure 5:
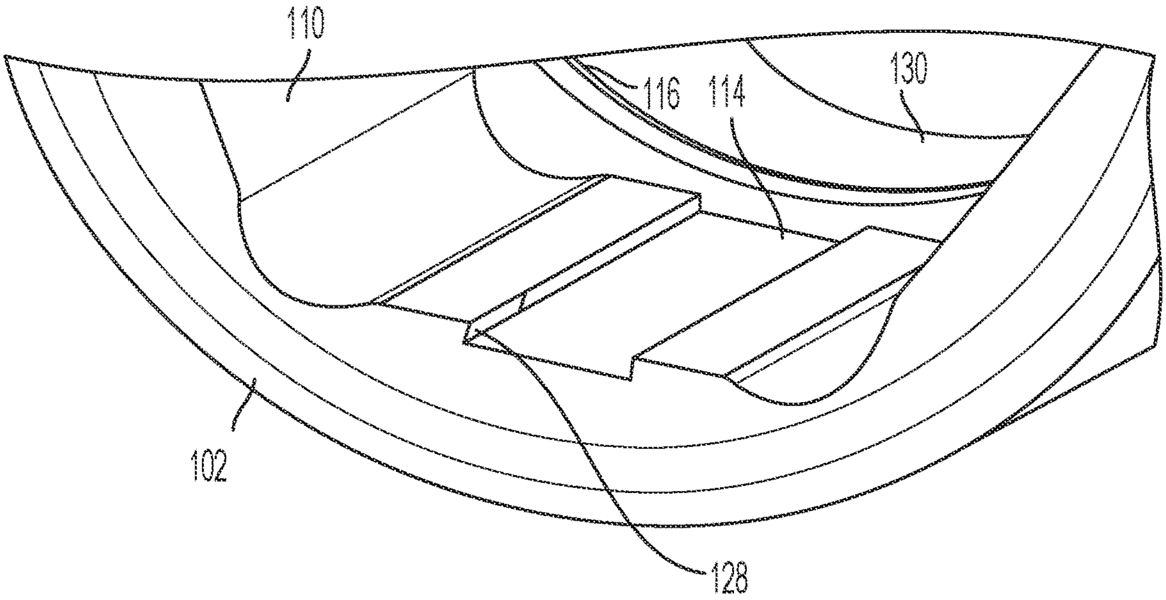
FIG. 5 is another detail, perspective view of a recess of the socket with a biasing member removed for clarity, according to an embodiment of the present invention.

The working end 102 includes a work piece aperture 110 adapted to receive a work piece, such as, for example, a bolt, nut, screw, or other threaded fastener, for transferring torque from the torque application tool to the work piece. The work piece aperture 110 includes a recess 114 formed therein and a longitudinal groove 116. In an embodiment, the groove 116 is formed in an internal surface 130 of the work piece aperture 110 and at least partially surrounds the work piece aperture 110. As illustrated in FIG. 5, the recess 114 may have a trapezoidal shaped portion 128.

A biasing member 112 is disposed in the work piece aperture 110 and is adapted to apply a biased frictional force to the work piece to limit or control lost-motion (i.e., backlash or slippage) during application of torque thereto, and to better engage the work piece in the work piece aperture 110. In an embodiment, the biasing member 112 provides enough frictional engagement with a work piece, wherein the work piece can be retained in the socket, thus allowing easier use of the socket and alignment of the work piece with an aperture, including the threads of such aperture, that it is to be inserted into. The biasing member 112 includes first 118 and second 120 opposing ends. The first end 118 is received in the recess 114 formed in the work piece aperture 110 that is adapted to restrict the first end 118 from moving in the radial direction. For example, the trapezoidal shaped portion 128 of the recess 114 functions as a dovetail feature to restrict radial movement of the first end 118. The second end 120 of the biasing member 112 includes a bent portion 122 that engages the groove 116 formed in the work piece aperture 110 of the socket 100, thereby restricting movement of the second end 120 of the biasing member 112 in the axial direction. Although two biasing members 112 are illustrated, the invention is not limited as such and any suitable number of biasing members 112 may be used. In an embodiment, the biasing member 112 is a flexible or pliable sheet metal piece, although the invention is not limited as such and any suitable material that can apply a bias force may be used.

During operation, the second end 120 moves radially into the groove 116 (indicated by direction arrow 124) as the work piece is inserted into the work piece aperture 110 until the second end 120 is substantially seated in the groove 116 when the work piece is fully inserted into the work piece aperture 110. Conversely, the second end 120 retracts due to the bias force (i.e., moves radially away from the groove 116, opposite direction arrow 124) when the work piece is retracted from the work piece aperture 110. Accordingly, the bias member 112 behaves like a cantilever beam, fixed at the first end 118 and free at the second end 120, to apply the bias force.

Figure 6:
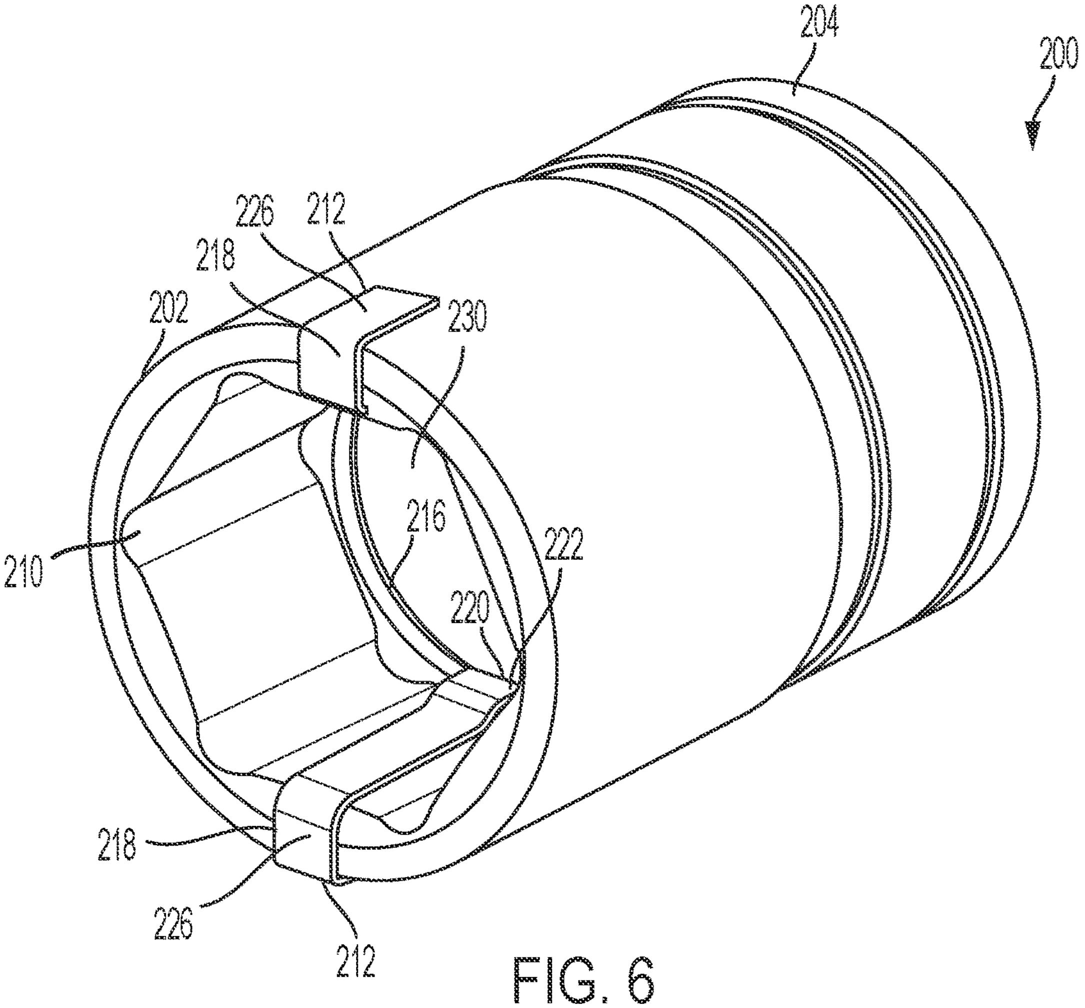
FIG. 6 is a perspective view of a socket, according to another embodiment of the present invention.

Referring to FIG. 6, an alternate embodiment of the socket 200 is shown. The socket 200 is substantially the same as the socket 100. Similar to the socket 100, socket 200 includes working 202 and driving 204 ends, a drive aperture 206, a work piece aperture 210, a biasing member 214, and a groove 216.

Similar to the biasing member 100, biasing member 200 includes first 218 and second 220 opposing ends. The first end 218 includes a hooked portion 226 that extends over the working end 202 and outer surface of the socket 200 to restrict the first end 218 from moving in the radial direction. The second end 220 of the biasing member 212 includes a bent portion 222 that engages the groove 216 formed in an internal surface 230 of the work piece aperture 210 of the socket 200, thereby restricting movement of the second end 220 of the biasing member 212 in the axial direction in a similar manner as described above. Although two biasing members 212 are illustrated, the invention is not limited as such and any suitable number of biasing members 212 may be used.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A socket having a working end with a work piece aperture that is adapted to receive a work piece and an opposing drive end adapted to engage a torque application tool, the socket comprising:

a biasing member substantially disposed in the work piece aperture and adapted to apply a frictional force to the work piece when the work piece is received in the work piece aperture and including opposing first and second ends, wherein the first end is disposed proximal to the working end and is restricted from moving in a radial direction, and the second end is disposed distal to the working end and includes a bent portion and a terminal end; and a groove formed in an internal surface of the work piece aperture, wherein the terminal end engages the groove and restricts the biasing member from moving in an axial direction, wherein the terminal end is adapted to move radially into the groove as the work piece is inserted into the work piece aperture, and move radially away from the groove when the work piece is retracted from the work piece aperture.

2. The socket of claim 1, further comprising a recess formed in an inner surface of the work piece aperture, wherein the recess receives the first end and is adapted to restrict the first end from moving in the radial direction.

3. The socket of claim 2, wherein the recess has a trapezoidal shaped portion adapted to receive the first end.

4. The socket of claim 1, wherein the groove at least partially surrounds the work piece aperture.

5. The socket of claim 1, wherein the biasing member is a sheet metal piece.

6. The socket of claim 1, wherein the first end of the biasing member includes a hooked portion that extends over the working end and outer surface of the socket to restrict the first end from moving in the radial direction.

7. The socket of claim 1, wherein the biasing member is biased to apply the frictional force to the work piece when the work piece is received in the work piece aperture.

8. A biasing member for a socket having a working end with a work piece aperture that is adapted to receive a work piece and an opposing drive end adapted to engage a torque application tool, wherein the biasing member is adapted to apply a biased frictional force to the work piece when the work piece is received in the work piece aperture, the biasing member comprising:

a first end adapted to be disposed proximal to the working end and restricted from moving in a radial direction relative to the socket; and a second end having a bent portion and a terminal end and adapted to be disposed distal to the working end, wherein the terminal end is adapted to engage a groove formed in an internal surface of the work piece aperture and restrict the biasing member from moving in an axial direction relative to the socket, and the terminal end is adapted to move radially into the groove as the work piece is inserted into the work piece aperture, and move radially away from the groove when the work piece is retracted from the work piece aperture.

9. The biasing member of claim 8, wherein the first end is adapted to be received in a recess of the work piece aperture to restrict the first end from moving in the radial direction.

10. The biasing member of claim 8, wherein the biasing member is a sheet metal piece.

11. The biasing member of claim 8, wherein the first end of the biasing member includes a hooked portion that is adapted to extend over the working end and an outer surface of the socket to restrict the first end from moving in the radial direction.

12. A socket having a working end with a work piece aperture that is adapted to receive a work piece and an opposing drive end adapted to engage a torque application tool, the socket comprising:

a flexible metal piece substantially disposed in the work piece aperture and adapted to apply a frictional force to the work piece when the work piece is received in the work piece aperture, wherein the flexible metal piece includes first and second opposing ends, the first end is disposed proximal to the working end and restricted from moving in a radial direction, and the second end is disposed distal to the working end and includes a bent portion and a terminal end; and a groove formed in an internal surface of the work piece aperture and at least partially surrounding the work piece aperture, wherein the terminal end engages the groove and restricts the flexible metal piece from moving in an axial direction, and wherein the terminal end is adapted to move radially into the groove as the work piece is inserted into the work piece aperture, and move radially away from the groove when the work piece is retracted from the work piece aperture.

13. The socket of claim 12, wherein the work piece aperture includes a recess with a trapezoidal shaped portion that receives the first end and is adapted to restrict the first end from moving in the radial direction.

14. The socket of claim 12, wherein the first end includes a hooked portion that extends over the working end and an outer surface of the socket to restrict the first end from moving in the radial direction.

15. The socket of claim 12, wherein the flexible metal piece is biased to apply the frictional force to the work piece when the work piece is received in the work piece aperture.

* * * * *